United States Patent
Doucet

(10) Patent No.: US 11,692,455 B1
(45) Date of Patent: Jul. 4, 2023

(54) PASSIVELY ORIENTABLE PRESSURE PROBE

(71) Applicant: PRATT & WHITNEY CANADA CORP., Longueuil (CA)

(72) Inventor: Frederic Doucet, Longueuil (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/933,134

(22) Filed: Sep. 19, 2022

(51) Int. Cl.
*F01D 17/08* (2006.01)

(52) U.S. Cl.
CPC .......... *F01D 17/08* (2013.01); *F05D 2260/80* (2013.01)

(58) Field of Classification Search
CPC .............................. F01D 17/08; F05D 2260/80
See application file for complete search history.

(56) References Cited

U.S. PATENT DOCUMENTS

| | | | | |
|---|---|---|---|---|
| 2,946,221 A * | 7/1960 | Annear | .................... | F01D 17/08 73/861.65 |
| 4,244,222 A * | 1/1981 | Hoyer | ..................... | G01F 1/684 416/61 |
| 4,433,584 A | 2/1984 | Kokoszka et al. | | |
| 4,823,615 A * | 4/1989 | Taha | ......................... | G01F 1/46 73/861.66 |
| 6,487,918 B1 * | 12/2002 | DeAngelis | ................ | G01F 1/46 73/861.66 |
| 7,243,556 B2 * | 7/2007 | Gryc | ......................... | G01F 1/46 73/861.65 |
| 9,856,743 B2 * | 1/2018 | Kockenpo | ............... | F01D 9/065 |
| 10,683,771 B2 * | 6/2020 | Jausovec | ................. | F01D 17/08 |

FOREIGN PATENT DOCUMENTS

KR 20200132567 A 11/2020

* cited by examiner

*Primary Examiner* — Jesse S Bogue
(74) *Attorney, Agent, or Firm* — Norton Rose Fulbright Canada LLP.

(57) ABSTRACT

An aircraft engine, has: a pressure probe having: a static member having a front face and a back face, an inlet and an outlet fluidly connected to the inlet, the front face defining a curved surface; a movable member movably engaged to the static member and movable relative to the static member about a center of rotation, the movable member having a central axis, the movable member having an engagement section matingly engaged to the front face to slide against the curved surface, the engagement section having an opening, and an orientation section protruding from the engagement section and located rearward of the center of rotation, the orientation section defining an external surface exposed to the flow, wherein the movable member is movable relative to the static member as a result of a force imparted by the flow on the external surface.

20 Claims, 4 Drawing Sheets

FIG_1

PASSIVELY ORIENTABLE PRESSURE PROBE

TECHNICAL FIELD

The disclosure relates generally to aircraft engines and, more particularly, to systems and methods used for measuring pressure of an airflow flowing through such engines.

BACKGROUND OF THE ART

Stagnation pressure is usually measured using a Pitot probe or Kiel head probe located within an airflow. For best measurement quality, the stagnation pressure to be measured is preferably as close as possible to the real value. A difference between the real value and the measured value varies with an angle defined between the Pitot probe or Kiel head probe and the incoming airflow. Thus, improvements in measuring the stagnation pressure are sought.

SUMMARY

In one aspect, there is provided an aircraft engine, comprising: a pressure probe for measuring a total pressure of a flow flowing through the aircraft engine, the pressure probe having: a static member having a front face facing the flow and a back face opposed to the front face, an inlet at the front face and an outlet at the back face, the outlet fluidly connected to the inlet and connectable to a pressure sensor, the front face defining a curved surface; a movable member movably engaged to the static member, the movable member movable relative to the static member about a center of rotation of the movable member, the movable member having a central axis, the movable member having an engagement section matingly engaged to the front face to slide against the curved surface, the engagement section having an opening for receiving the flow and fluidly connected to the inlet of the static member, and an orientation section protruding from the engagement section along the central axis and located rearward of the center of rotation relative to a direction of the flow, the orientation section defining an external surface exposed to the flow and facing away from the central axis.

The aircraft engine may have any of the following features, in any combinations.

In some embodiments, the movable member is movable relative to the static member from a first position in which a force exerted by the flow on the external surface is non-axisymmetric thereby creating a moment on the movable member about the center of rotation to a second position in which the force is axisymmetric.

In some embodiments, the external surface is oriented such as to be intersected by the flow at least when the central axis is non-parallel to the flow to move the movable member relative to the static member.

In some embodiments, a conduit section protrudes from the engagement section along the central axis and located forward of the center of rotation, the conduit section having a conduit inlet for receiving the flow and a conduit outlet fluidly connected to an opening and to the inlet of the static member.

In some embodiments, the inlet of the static member is defined by a plurality of apertures extending through the curved surface.

In some embodiments, more than one of the plurality of apertures are in register with an opening of the engagement section at a plurality of positions of the movable member relative to the static member.

In some embodiments, the static member includes a sphere disposed at an end of a conduit leading to the pressure sensor, the curved surface defined by the sphere, the engagement section matingly engaged to the sphere.

In some embodiments, the sphere is hollow.

In some embodiments, the back face is defined by the sphere, a seal secured to the movable member to seal a gap defined between the back face and the movable member.

In some embodiments, the movable member has a frustoconical shape and flares away from the central axis in a direction of the flow.

In another aspect, there is provided a pressure probe for measuring a total pressure of a flow, comprising: a static member having a front face facing the flow and a back face opposed to the front face, an inlet at the front face and an outlet at the back face, the outlet fluidly connected to the inlet and connectable to a pressure sensor, the front face defining a curved surface; a movable member movably engaged to the static member, the movable member movable relative to the static member about a center of rotation of the movable member, the movable member having a central axis, the movable member having an engagement section matingly engaged to the front face to slide against the curved surface, the engagement section having an opening for receiving the flow and fluidly connected to the inlet of the static member, and an orientation section protruding from the engagement section along the central axis and located rearward of the center of rotation relative to a direction of the flow, the orientation section defining an external surface exposed to the flow, facing away from the central axis, and extending circumferentially around the central axis.

The pressure probe may include any of the following features, in any combinations.

In some embodiments, the movable member is movable relative to the static member from a first position in which the a force exerted by the flow on the external surface is non-axisymmetric thereby creating a moment on the movable member about the center of rotation to a second position in which the force is axisymmetric.

In some embodiments, the external surface oriented such as to be intersected by the flow at least when the central axis is non-parallel to the flow to move the movable member relative to the static member.

In some embodiments, a conduit section protrudes from the engagement section along the central axis and located forward of the center of rotation, the conduit section having a conduit inlet for receiving the flow and a conduit outlet fluidly connected to opening and to the inlet of the static member.

In some embodiments, the inlet of the static member is defined by a plurality of apertures extending through the curved surface.

In some embodiments, more than one of the plurality of apertures are in register with an opening of the engagement section at a plurality of positions of the movable member relative to the static member.

In some embodiments, the static member includes a sphere disposed at an end of a conduit leading to the pressure sensor, the curved surface defined by the sphere, the engagement section matingly engaged to the sphere.

In some embodiments, the sphere is hollow.

In some embodiments, the back face is defined by the sphere, a seal secured to the movable member to seal a gap defined between the back face and the movable member.

In some embodiments, the movable member has a frustoconical shape and flares away from the central axis in a direction of the flow.

DESCRIPTION OF THE DRAWINGS

Reference is now made to the accompanying figures in which.

DETAILED DESCRIPTION

Figure 1:
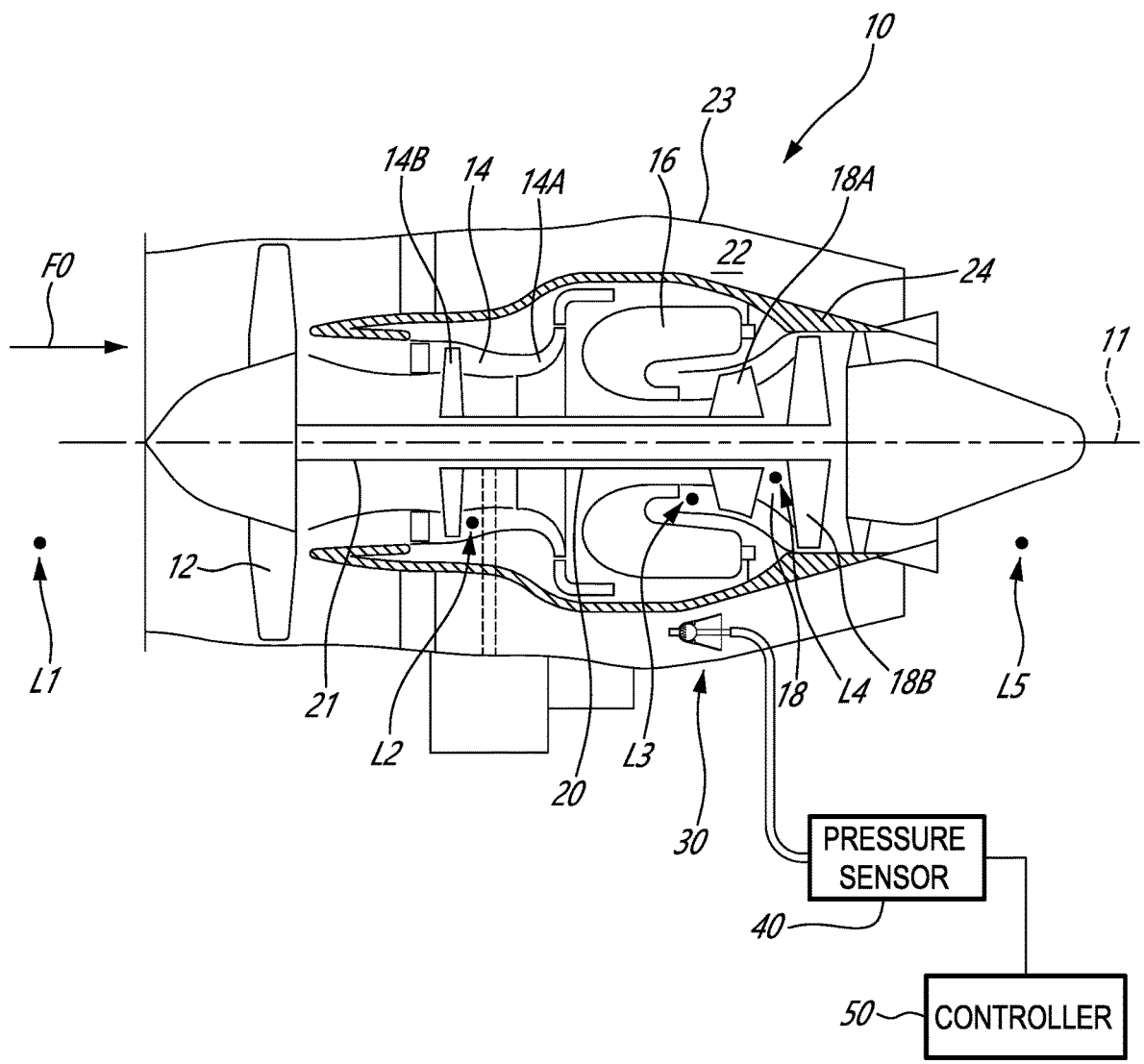
FIG. 1 is a schematic cross sectional view of an aircraft engine depicted as a gas turbine engine.

FIG. 1 illustrates an aircraft engine depicted as a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The fan 12, the compressor section 14, and the turbine section 18 are rotatable about a central axis 11 of the gas turbine engine 10.

In the embodiment shown, the gas turbine engine 10 comprises a high-pressure spool having a high-pressure shaft 20 drivingly engaging a high-pressure turbine 18A of the turbine section 18 to a high-pressure compressor 14A of the compressor section 14, and a low-pressure spool having a low-pressure shaft 21 drivingly engaging a low-pressure turbine 18B of the turbine section to a low-pressure compressor 14B of the compressor section 14 and drivingly engaged to the fan 12. It will be understood that the contents of the present disclosure may be applicable to any suitable engines, such as turboprops and turboshafts, and reciprocating engines, such as piston and rotary engines without departing from the scope of the present disclosure.

In some cases, during flight or during experimental testing of the gas turbine engine 10, it may be required to determine a total pressure of an air flow F0 moving through the gas turbine engine 10. To this extend a pressure probe 30 may be used. The pressure probe 30 may be located at any suitable locations. For instance, in the embodiment shown, the pressure probe 30 is located within a bypass duct 22 located radially between an outer casing 23 and a core casing 24. However, the pressure probe 30 may be located at any other required locations. For instance, the pressure probe 30 may be located at a first location L1 upstream of the gas turbine engine 10 during bench testing of said engine; it may be located at a second location L2 between the low-pressure compressor 14B and the high-pressure compressor 14A; it may be located at a third location L3 downstream of the combustor 16; it may be located at a fourth location L4 between the high-pressure turbine 18A and the low-pressure turbine 18B; it may be located at a fifth location L5 downstream of the gas turbine engine 10. The pressure probe 30 may be located between stages of the compressor section 14 or between stages of the turbine section 18. The gas turbine engine 10 may be equipped with more than one pressure probe 30 distributed at many possible locations.

The pressure probe 30 may be fluidly connected to a pressure sensor 40 able to convert a pressure force into a signal indicative of a pressure. The pressure sensor 40 may be operatively connected to a controller 50 of the gas turbine engine 10. The controller 50 may vary some operating parameters of the gas turbine engine 10 as a function of the pressure thereby measured. The pressure sensor 40 may be operatively connected to a data acquisition system for engine testing purposes.

Figure 2:
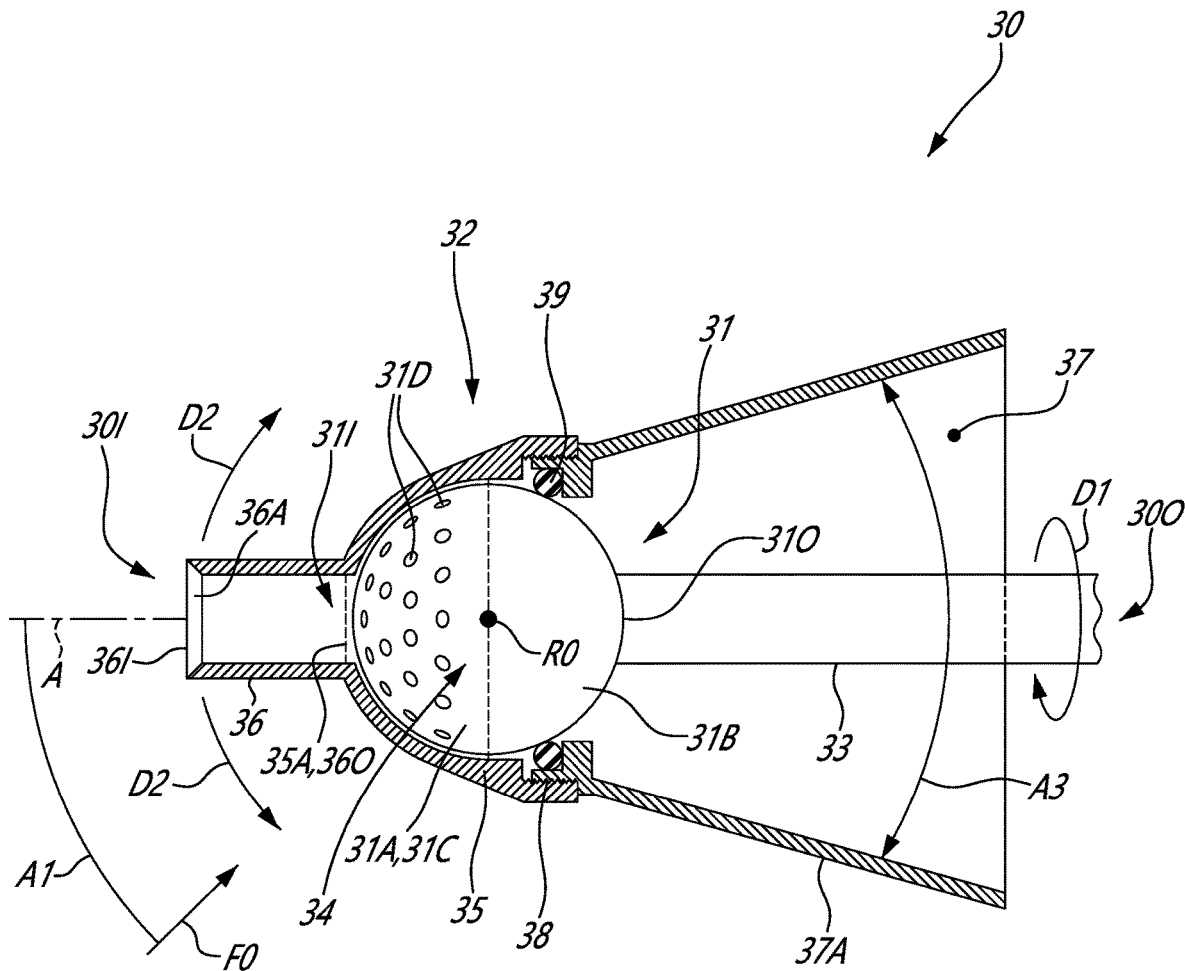
FIG. 2 is a cross-sectional view of a pressure probe in accordance with one embodiment to be used with the gas turbine engine of FIG. 1; the pressure probe shown in a first position.

Referring now to FIG. 2, the pressure probe 30 is described in more detail. In the embodiment shown, the pressure probe 30 includes a static member 31 and a movable member 32. As will be explained below, the movable member 32 to is able to move relative to the static member 31 to orient itself with the flow F0 flowing towards the pressure probe 30. The pressure probe 30 has an inlet 30I and an outlet 30O. The outlet 30O is fluidly connected to the pressure sensor 40 (FIG. 1). The inlet 30I is oriented to receive air from the flow F0.

The measurement of stagnation pressure is usually made with a Pitot probe or Kiel head probe located in the free air stream. For best measurement quality, the stagnation pressure to be measured is as close as possible to the real value. The ratio of the measured value versus the real value, usually named recovery ratio, can vary between 0 and 1. For example, 0.99 indicates that 99% of the real pressure is effectively measured. The recovery characteristics can be evaluated with calibration tests. One of the factors that affects the recovery ratio is the angle of the air stream versus the probe angle. When the probe pressure hole is facing the air stream, recovery is optimal, and it decreases as incoming air angle increases. To reduce the loss of recovery, a Kiel head probe may be used to augment the incoming air angle range. With a Kiel head probe, stagnation pressure measurement is less sensitive to yaw/pitch angle. Yet a Kiel head also has its limits. Limits are characterized as an angle range (i.e. ±35°) where the measurement error in stagnation pressure is below a certain amount (i.e. <1% error). For turbine engine tests or aerodynamic tests, the Kiel head acceptance angle range may not be sufficient for all stagnation pressure measurement needs. This is true especially where the air stream angle can vary significantly (i.e., air stream behind variable guide vanes, air stream behind a rotor operating at various speeds and mass flows). There are other solutions like a five-hole probe. However, this type of probes requires specific calibration.

The disclosed pressure probe 30 may alleviate these drawbacks. The pressure probe 30 disclosed herein may augment the acceptance angle at which the recovery is optimal by orienting itself to face the free air stream. It mechanically moves to face the flow.

Still referring to FIG. 2, the static member 31 includes a conduit 33 that is fluidly connected to the outlet 30O of the pressure probe 30 and that leads to the pressure sensor 40 (FIG. 1). A sphere 34 is secured to an end of the conduit 33. The sphere 34 may be hollow and defines a front face 31A and a back face 31B of the static member 31. A dashed line illustrates an imaginary separation between the front face 31A and the back face 31B. The front face 31A defines a curved surface 31C, which is herein of spherical shape but any suitable shape is contemplated. The static member 31 has a static member inlet 31I at the front face 31A and a static member outlet 31O at the back face 31B. The static member inlet 31I is fluidly connected to the static member outlet 31O, which is itself fluidly connected to the pressure sensor 40 (FIG. 1) via the conduit 33. In the embodiment shown, the static member inlet 31I is defined by a plurality of apertures 31D extending through the front face 31A. These apertures 31D may be equidistantly spaced from one another and uniformly distributed. The back face 31B may be free of the apertures 31D. Each of these apertures 31D is fluidly connected to the static member outlet 31O of the static member 31.

The movable member 32 includes an engagement section 35 movably engaged to the static member 31. The movable member 32 is movable relative to the static member 31 about a center of rotation R0. The movable member 32 has a central axis A, which may intersect the center of rotation R0. The engagement section 35 is matingly engaged to the front face 31A of the static member 31 to slide against the curved surface 31C. Stated differently, the engagement section 35 has a shape that substantially correspond to that of the curved surface 31C such that the engagement section 35 may move relative to the curved surface 31C. The engagement section 35 is therefore matingly engaged to the sphere 34. The movable member 32 may move relative to the static member 31 about a first direction D1 parallel to the central axis A, and about a plurality of directions normal to the central axis A, one of those directions, referred to below as a second direction D2, is illustrated with arrows in FIG. 2.

The engagement section 35 has an opening 35A shown with a dashed line. The opening 35A is used for receiving the flow F0 and is fluidly connected to the static member inlet 31I, herein the apertures 31D, of the static member 31. As shown in FIG. 2, the opening 35A may be in register with more than one of the apertures 31D regardless of the position of the movable member 32 relative to the static member 31. This may ensure that the pressure sensor 40 is suitably exposed to the air pressure of the flow F0.

The movable member 32 may include a conduit section 36 protruding from the engagement section 35 along the central axis A. The conduit section 36 may be located forward of the center of rotation R0 relative to the direction of the flow F0. The conduit section 36 and the engagement section 35 are shown herein as being monolithic parts of a single body, but may be two separate parts secured (e.g., fastened, welded) together. The conduit section 36 has a conduit inlet 36I and a conduit outlet 36O fluidly connected to the conduit inlet 36I and to the opening 35A of the engagement section 35. Thus, air enters the conduit section 36 via the conduit inlet 36I, exits the conduit section 36 via the conduit outlet 36O and flows within the engagement section 35 via the opening 35A to reach the apertures 31D of the static member 31. The conduit section 36 has a chamfer 36A at the conduit inlet 36I. This chamfer 36A may help in increasing a range of angle between the flow F0 and the central axis A.

To orient the movable member 32 relative to the static member 31 such that the opening 35A of the engagement section 35, and herein the conduit inlet 36I of the conduit section 36, are aligned parallel to the direction of the flow F0, the pressure probe 30 includes an orientation section 37, also referred to as a skirt. The orientation section 37 protrudes from the engagement section 35 along the central axis A and is located rearward of the center of rotation R0 relative to the direction of the flow F0. The orientation section 37 and the engagement section 35 may be parts of a single monolithic body or, as shown herein, may be connected together via a threaded connection 38. The threaded connection 38 may be replaced by any connection means such as, for instance, snap fit, fasteners, tongue and groove, welding, and so on.

The orientation section 37 defines an external surface 37A that faces away from the central axis A and that is exposed to the flow F0. The orientation section 37 has herein a frustoconical shape and flares away from the central axis A in a direction of the flow F0, but any other suitable shape is contemplated. The orientation section 37 defines an opening angle A3 that may be about 45 degrees. The angle A3 may vary from 20 to 50 degrees. The angle A3 may be selected to meet air flow angle needs. In some cases, the opening angle A3 may be zero or less than zero. The external surface 37A extends circumferentially around the central axis A. In the embodiment shown, the external surface 37A extends about a full circumference around the central axis A. Alternatively, the external surface 37A may be defined by a plurality of tabs or fins circumferentially distributed about the central axis A. The external surface 37A may define a plurality of apertures such as to reduce a drag exerted on the flow F0 by the orientation section 37. The external surface 37A may be axisymmetric about the central axis A. It will be appreciated that an area of the external surface 37A contacted with the flow F0 may be greater than that of an external surface of the conduit section 36.

Figure 3:
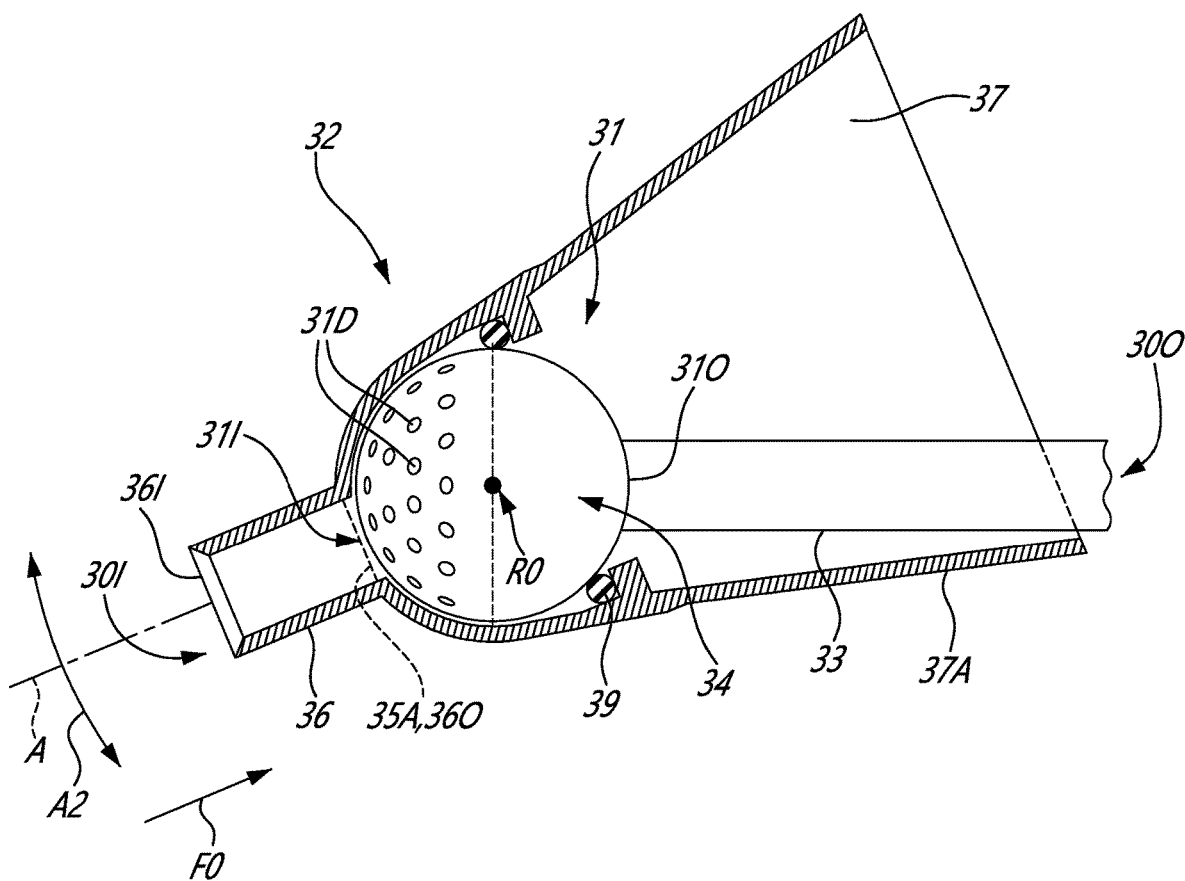
FIG. 3 is another cross-sectional view of the pressure probe of FIG. 2 shown in a second position.

Referring to FIGS. 2 and 3, in use, the movable member 32 is movable relative to the static member 31 from a first position (FIG. 2) to a second position (FIG. 3) as a result of a force imparted by the flow F0 on the external surface 37A. It will be appreciated that the movable member 32 may be located at a plurality of positions relative to the static member 31. In other words, when the central axis A is non-parallel to the flow F0, a force of the flow F0 exerted on the external surface 37A of the orientation section 37 is non-axisymmetric. Stated differently, the external surface 37A is oriented such as to be intersected by the flow F0 at least when the central axis A is non-parallel to the flow F0 to move the movable member 32 relative to the static member 31 from the first position to the second position. That is, in FIG. 2, the force exerted by the flow F0 on a lower half of the external surface 37A may be greater than that exerted on an upper half of the external surface 37A. In turn, this force on the external surface 37A of the orientation section 37 creates a moment on the movable member 32 about the center of rotation R0 to pivot the movable member 32 from the first position of FIG. 2 to the second position of FIG. 3 in which the force exerted on the external surface 37A may be axisymmetric. In some embodiments, a difference between maximal and minimal forces exerted on the external surface 37A is reduced by moving the movable member 32 from the first position to the second position. In some cases, it may not be possible to make the force axisymmetric and the orientation section 37 may abut against the conduit 33.

Still referring to FIGS. 2-3, a first angle A1 defined between the central axis A and the flow F0 in the first position of the movable member 32 is different than a second angle A2 defined between the central axis A and the flow F0 in the second position of the movable member 32. Herein, the second angle A2 is less than the first angle A1. Herein, the second angle A2 may be zero such that the central axis A is parallel to the flow F0. Stated differently, the angle between the flow F0 and the central axis A decreases form the first position to the second position. The orientation section 37 may therefore act as a parachute to passively orient the movable member 32 parallel, or as close as possible to a parallel orientation, to the flow F0 to minimize a drag force exerted on the movable member 32 by the flow F0. Put differently, the pressure probe 30 is non-actuated and the movable member 32 is free from engagement with an actuator.

As shown in FIG. 2, a seal 39, such as an O-ring, is disposed between the sphere 34 and the movable member 32. The seal 39 may be secured to the movable member 32 proximate where the orientation section 37 is secured to the engagement section 35. The seal 39 rides against the back face 31B of the static member 31; said back face 31B being defined by the sphere 34 in the present embodiment. Thus, the seal 39 seals a gap between the movable member 32 and the sphere 34. The seal 39 may therefore ensure that all of the air that enters the inlet 30I of the pressure probe 30 reaches the pressure sensor 40 (FIG. 1). Moreover, all of the apertures 31D are located on the front face 31A of the movable member 32; the front face 31A defined by the sphere 34. The back face 31B is free of the apertures 31D. In other words, the surface of the sphere 34 that is in contact with the seal 39 when the movable member 32 moves relative to the static member 31 is free of the apertures 31D. This may ensure that none of the apertures 31D is located rearward of the seal 39 to avoid air not reaching the pressure sensor 40. Other means of sealing could be employed with respect to the manufacturing characteristics. Small aft leakage could be acceptable as long as the recovery ratio stays optimal. In some embodiments, the seal 39 may be omitted if the "sphericity" of the contact area between the back face 31B and the orientation section 37 is significant enough to only allow a negligible air leak between the two. This air leak should be negligible enough so that it does not reduce the quality of the stagnation pressure measurement. The orientation section 37 angle A3 may be adjusted to meet the angle range needed. The orientation section 37 may be plain or perforated to achieve the self-facing performance required function of size, Mach number, density, fluid type.

Figure 4:
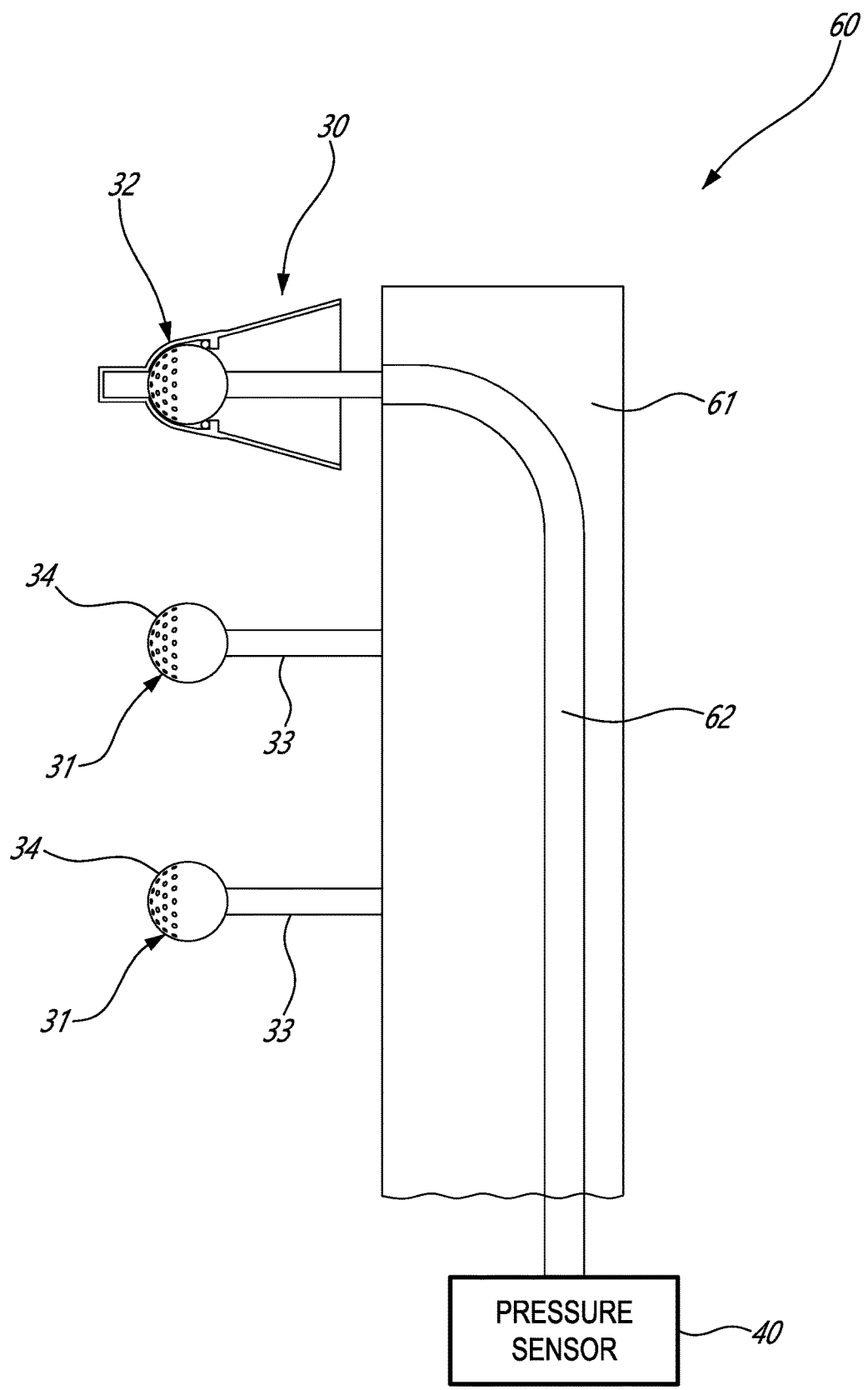
FIG. 4 is a top view of a pressure probe rake including a plurality of the pressure probes of FIG. 2, some of the pressure probes having parts removed for illustration purposes.

Referring now to FIG. 4, a pressure probe rake is shown at 60. The rake 60 includes a frame 61 onto which are secured a plurality, three in the embodiment shown, but more or less may be used, of the pressure probes 30 described above. Each of these pressure probes 30 is fluidly connected to a respective pressure sensor 40.

Once all assembled, when the probe is inserted in a free air stream, it aligns itself to face the flow. If the flow angle is higher than the mechanical angle that the probe can moves, the impact tube itself can accept an additional angle range with optimal recovery ratio from that mechanical angle position.

In an alternate embodiment, the pressure probe 30 may be movable solely in one direction (e.g., pitch or yaw). The probe sphere size may be as small as few millimeters or bigger for structural integrity and available space.

The pressure probe 30 and pressure probe rake 60 may be installed in the free air stream upstream or downstream of the gas turbine engine 10. In some cases, the pressure probe 30 and pressure probe rake 60 may be installed within the engine at locations where determining the total pressure is required.

The disclosed pressure probe 30 may also be used for other types of aerodynamics or fluid dynamics testing. Like aircrafts, cars, wind tunnel tests, and so on.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. An aircraft engine, comprising:
a pressure probe for measuring a total pressure of a flow flowing through the aircraft engine, the pressure probe having:
a static member having a front face facing the flow and a back face opposed to the front face, an inlet at the front face and an outlet at the back face, the outlet fluidly connected to the inlet and connectable to a pressure sensor, the front face defining a curved surface;
a movable member movably engaged to the static member, the movable member movable relative to the static member about a center of rotation of the movable member, the movable member having a central axis, the movable member having
an engagement section matingly engaged to the front face to slide against the curved surface, the engagement section having an opening for receiving the flow and fluidly connected to the inlet of the static member, and
an orientation section protruding from the engagement section along the central axis and located rearward of the center of rotation relative to a direction of the flow, the orientation section defining an external surface exposed to the flow and facing away from the central axis.

2. The aircraft engine of claim 1, wherein the movable member is movable relative to the static member from a first position in which a force exerted by the flow on the external surface is non-axisymmetric thereby creating a moment on the movable member about the center of rotation to a second position in which the force is axisymmetric.

3. The aircraft engine of claim 1, wherein the external surface is oriented such as to be intersected by the flow at least when the central axis is non-parallel to the flow to move the movable member relative to the static member.

4. The aircraft engine of claim 1, comprising a conduit section protruding from the engagement section along the central axis and located forward of the center of rotation, the conduit section having a conduit inlet for receiving the flow and a conduit outlet fluidly connected to an opening and to the inlet of the static member.

5. The aircraft engine of claim 1, wherein the inlet of the static member is defined by a plurality of apertures extending through the curved surface.

6. The aircraft engine of claim 5, wherein more than one of the plurality of apertures are in register with an opening of the engagement section at a plurality of positions of the movable member relative to the static member.

7. The aircraft engine of claim 1, wherein the static member includes a sphere disposed at an end of a conduit leading to the pressure sensor, the curved surface defined by the sphere, the engagement section matingly engaged to the sphere.

8. The aircraft engine of claim 7, wherein the sphere is hollow.

9. The aircraft engine of claim 7, wherein the back face is defined by the sphere, a seal secured to the movable member to seal a gap defined between the back face and the movable member.

10. The aircraft engine of claim 1, wherein the movable member has a frustoconical shape and flares away from the central axis in a direction of the flow.

11. A pressure probe for measuring a total pressure of a flow, comprising:

a static member having a front face facing the flow and a back face opposed to the front face, an inlet at the front face and an outlet at the back face, the outlet fluidly connected to the inlet and connectable to a pressure sensor, the front face defining a curved surface;

a movable member movably engaged to the static member, the movable member movable relative to the static member about a center of rotation of the movable member, the movable member having a central axis, the movable member having an engagement section matingly engaged to the front face to slide against the curved surface, the engagement section having an opening for receiving the flow and fluidly connected to the inlet of the static member, and an orientation section protruding from the engagement section along the central axis and located rearward of the center of rotation relative to a direction of the flow, the orientation section defining an external surface exposed to the flow, facing away from the central axis, and extending circumferentially around the central axis.

12. The pressure probe of claim 11, wherein the movable member is movable relative to the static member from a first position in which a force exerted by the flow on the external surface is non-axisymmetric thereby creating a moment on the movable member about the center of rotation to a second position in which the force is axisymmetric.

13. The pressure probe of claim 11, wherein the external surface oriented such as to be intersected by the flow at least when the central axis is non-parallel to the flow to move the movable member relative to the static member.

14. The pressure probe of claim 11, comprising a conduit section protruding from the engagement section along the central axis and located forward of the center of rotation, the conduit section having a conduit inlet for receiving the flow and a conduit outlet fluidly connected to opening and to the inlet of the static member.

15. The pressure probe of claim 11, wherein the inlet of the static member is defined by a plurality of apertures extending through the curved surface.

16. The pressure probe of claim 15, wherein more than one of the plurality of apertures are in register with an opening of the engagement section at a plurality of positions of the movable member relative to the static member.

17. The pressure probe of claim 11, wherein the static member includes a sphere disposed at an end of a conduit leading to the pressure sensor, the curved surface defined by the sphere, the engagement section matingly engaged to the sphere.

18. The pressure probe of claim 17, wherein the sphere is hollow.

19. The pressure probe of claim 17, wherein the back face is defined by the sphere, a seal secured to the movable member to seal a gap defined between the back face and the movable member.

20. The pressure probe of claim 11, wherein the movable member has a frustoconical shape and flares away from the central axis in a direction of the flow.

* * * * *